US006832808B1

(12) United States Patent
Bennett

(10) Patent No.: US 6,832,808 B1
(45) Date of Patent: Dec. 21, 2004

(54) CARGO TRAILER THIN WALL, OFFSET POST CONSTRUCTION

(75) Inventor: Jeffrey J. Bennett, City of Industry, CA (US)

(73) Assignee: Utility Trailer Manufacturing Company

( * ) Notice: Subject to any disclaimer, the term of this patent is extended or adjusted under 35 U.S.C. 154(b) by 0 days.

(21) Appl. No.: 10/645,251

(22) Filed: Aug. 20, 2003

Related U.S. Application Data

(63) Continuation-in-part of application No. 09/964,784, filed on Sep. 26, 2001, now Pat. No. 6,652,019, which is a continuation-in-part of application No. 09/813,729, filed on Mar. 21, 2001, now abandoned.

(51) Int. Cl.[7] .................................................. B60J 7/00
(52) U.S. Cl. .................................................. 296/186.1
(58) Field of Search ........................... 296/186.1, 182.1

(56) References Cited

U.S. PATENT DOCUMENTS 6,497,451 B1 * 12/2002 Jones et al. .............. 296/186.1

* cited by examiner

Primary Examiner—Joseph D. Pape
(74) Attorney, Agent, or Firm—Conrad R. Solum, Jr.; Fulbright & Jaworski

(57) ABSTRACT

A cargo trailer having thin side walls mounted to top and bottom side rails wherein the thin walls consist of a plurality of adjacent overlapping outer plates, a plurality of regularly spaced thin posts and a plurality of thin liner panels between and overlapping the posts. The thin posts are reduced in thickness and inwardly offset opposite the top and bottom side rails and are positioned inside those rails. The offset portion of the posts moves the major portions of the posts outwardly to be coplanar with the exteriors of the top and bottom side rails and increases the interior width of the trailer. A stress plate may be provided along lower portions of the posts. The outer plates, posts and liner panels are fastened together and to the top and bottom rails.

34 Claims, 7 Drawing Sheets

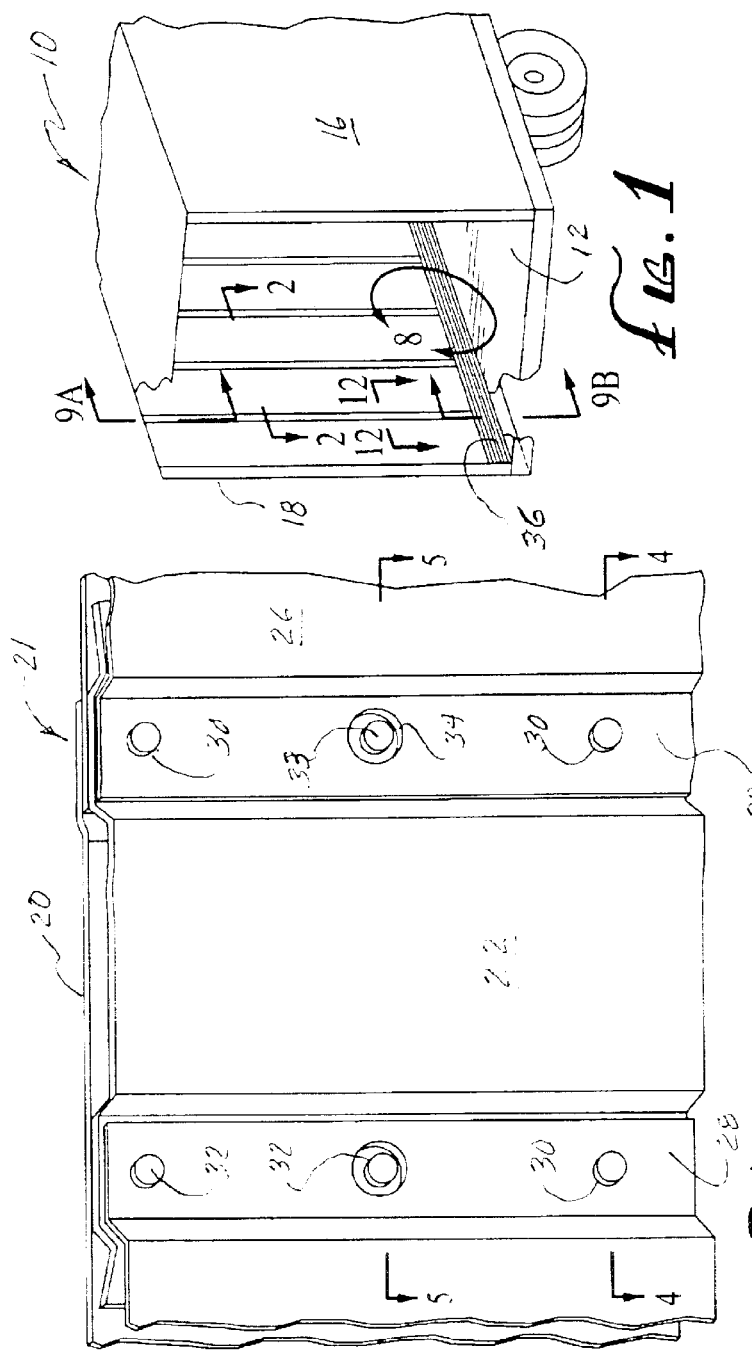
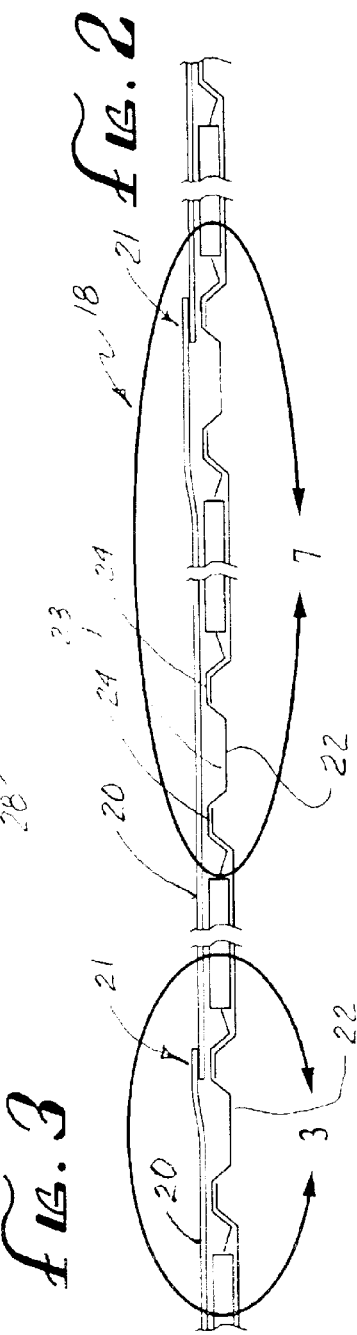

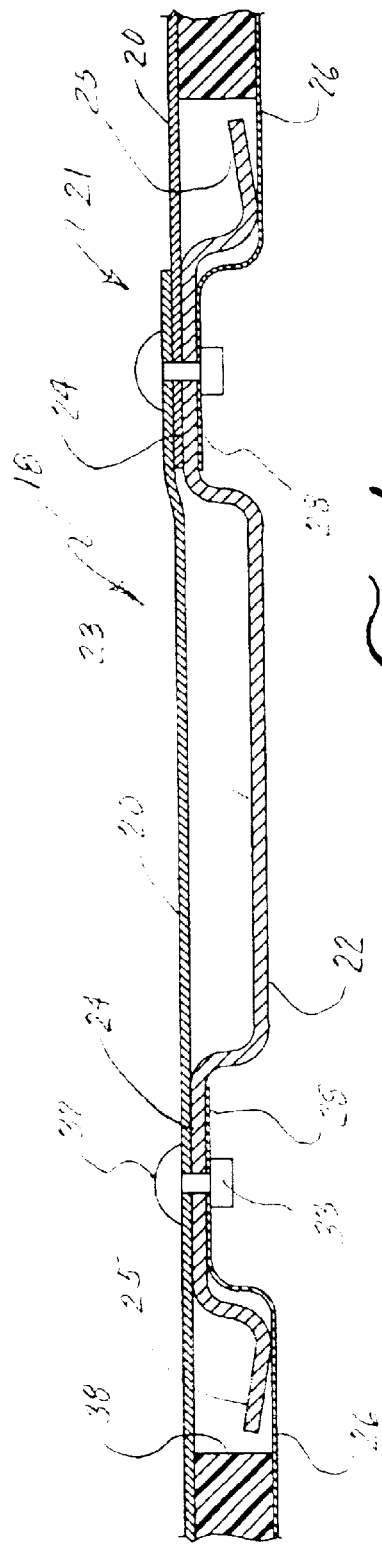
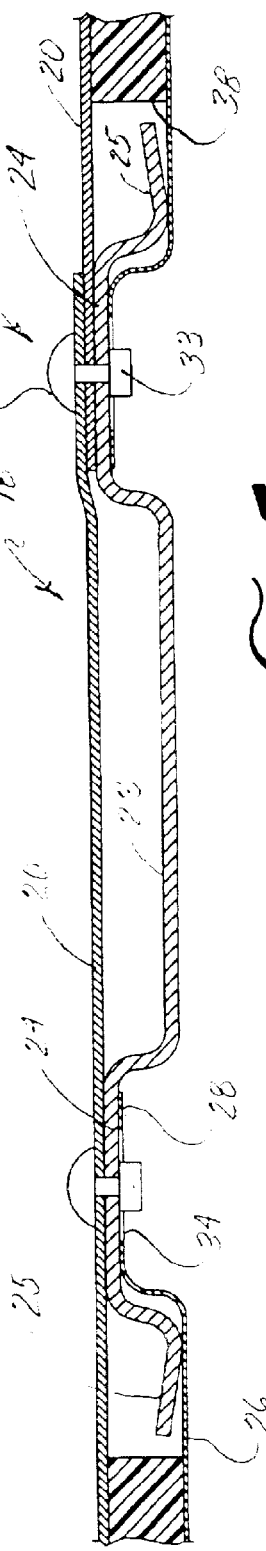
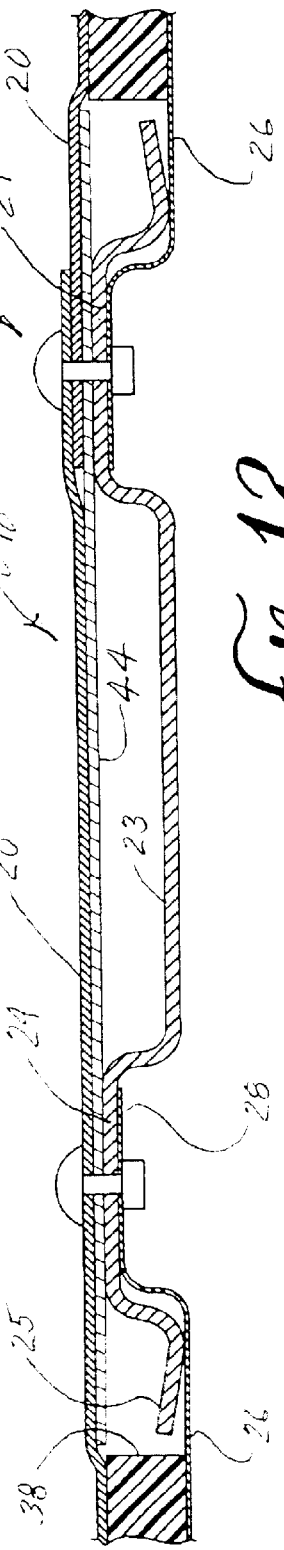

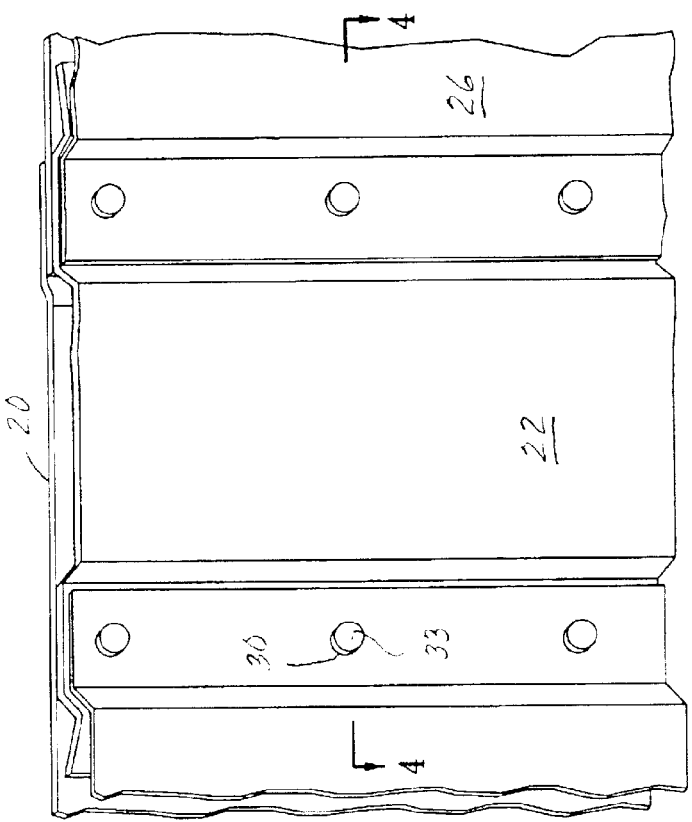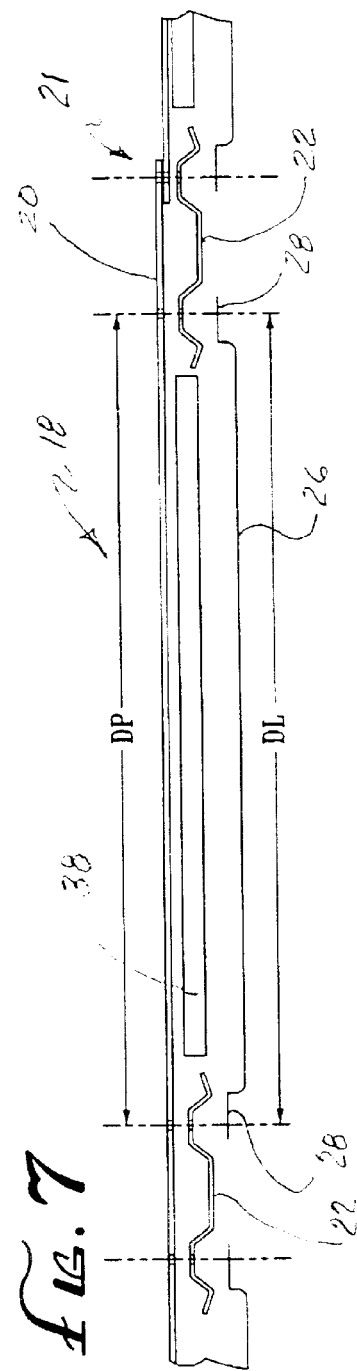

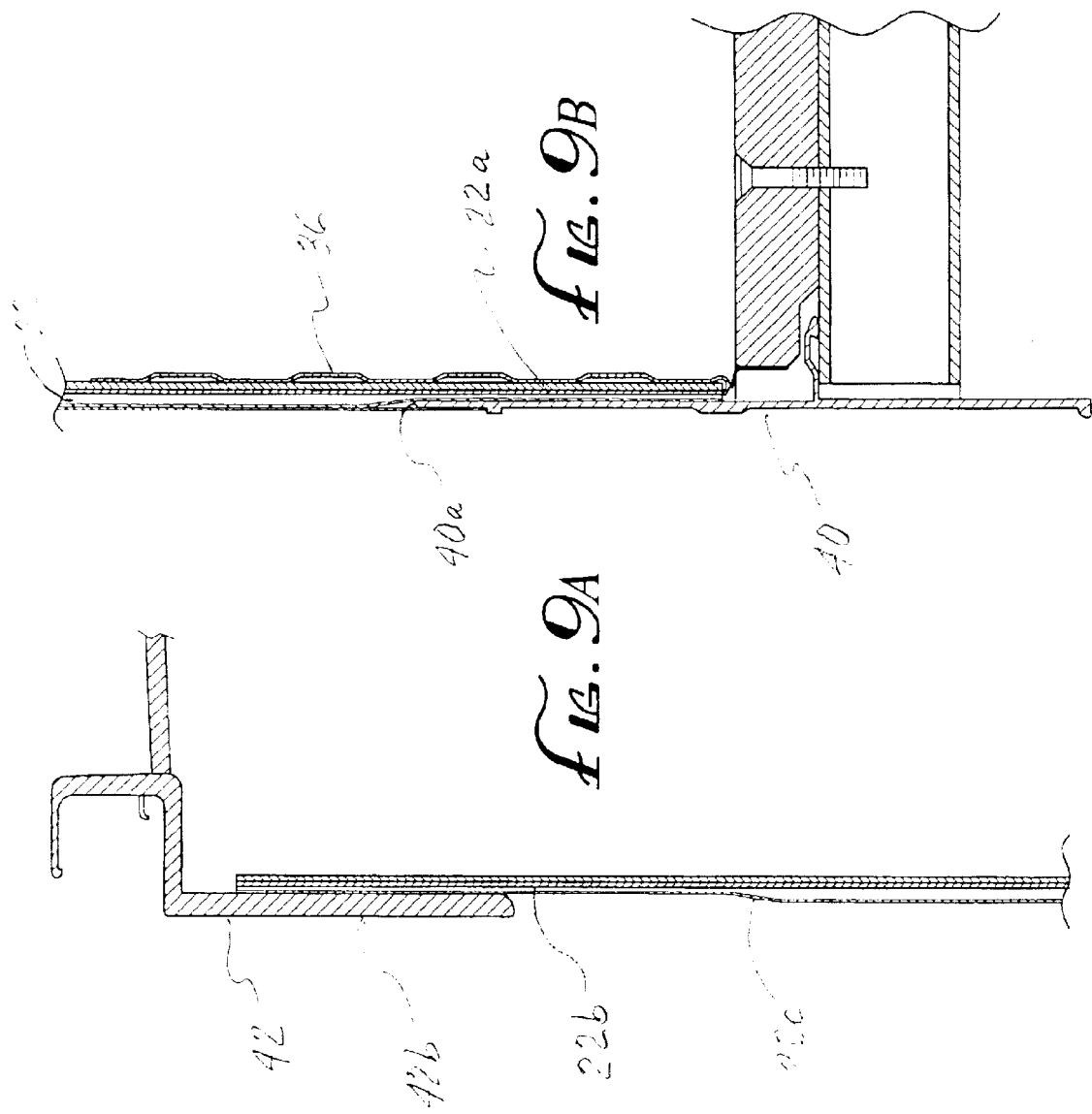

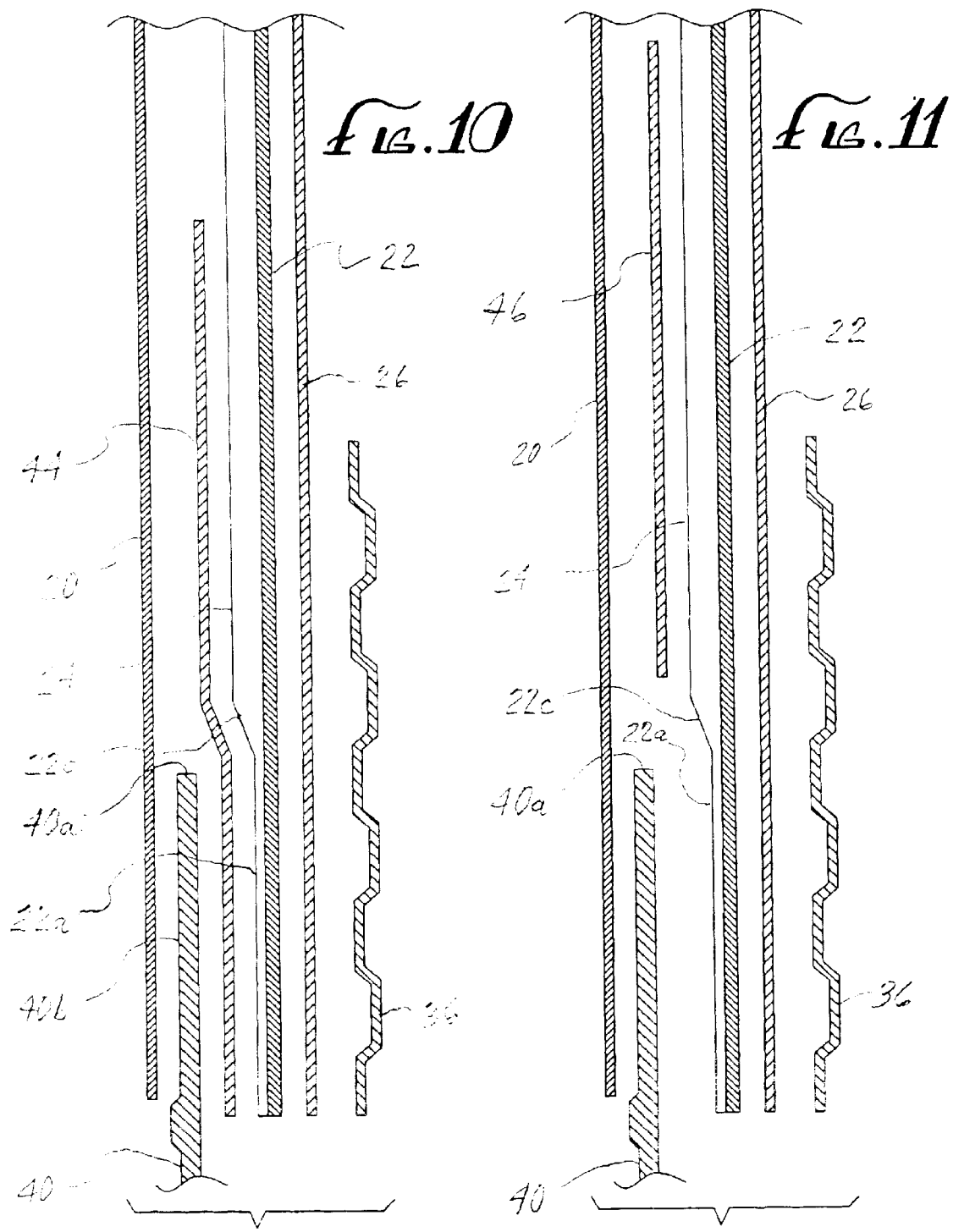

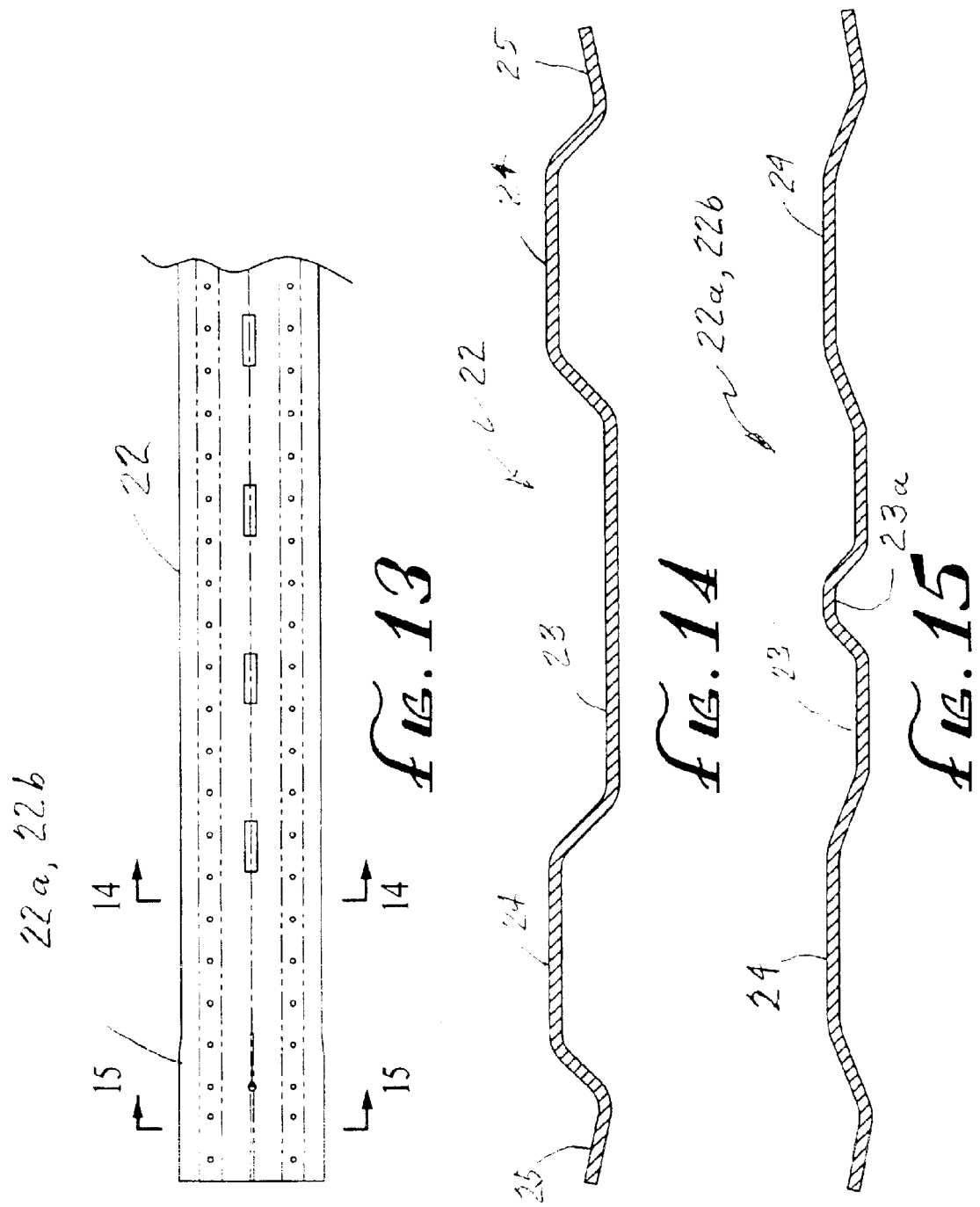

CARGO TRAILER THIN WALL, OFFSET POST CONSTRUCTION

This is a Continuation-In-Part of U.S. Ser. No. 09/964,784, filed Sep. 26, 2001, now U.S. Pat. No. 6,652,019, which was a Continuation-In-Part of U.S. Ser. No. 09/813,729 filed Mar. 21, 2001, now abandoned.

FIELD OF THE INVENTION

This invention relates generally to the construction of a cargo trailer and more particularly to an improved construction of the side walls of the cargo trailers allowing for a thinner wall construction which results in maximizing the interior volume of the cargo trailer.

BACK OF THE INVENTION

There are many cargo trailers and other such containers that typically utilize rectangular panels placed adjacent to each other to form the side walls of the trailers, such as those disclosed in U.S. Pat. Nos. 5,439,266, 4,904,017, 4,810,027 and 6,003,932. The cargo trailers disclosed in those patents typically contain adjacent rectangular plates placed side by side with an additional narrow plate or plates overlapping the adjacent plates to join the plates together.

Wall constructions of this type have been utilized because of the regulations governing such vehicles. These regulations generally limit the overall width of the cargo trailer. The advantage of having the plates side by side with a thin narrow plate(s) to overlap the adjacent panels creates a thin wall that results in a maximum cargo volume. However, because of the size of these panels and the nature of the construction, the structural strength of these side walls is weakened.

The prior art has attempted to construct a thin wall trailer having a maximum cargo volume while maintaining the structural integrity of the walls. Some attempts have been made which eliminate structural posts by increasing the thickness of the panels to increase their integral strength. This results in a much more costly and difficult construction process because of the size of the panels required for these trailers. Other prior art has attempted to integrate the post into the joining plates so that the overall thickness of the wall remains as thin as possible. These wall constructions also have problems. The posts protrude outward of the trailer making them more prone to damage. There are also problems with maintaining the stiffness and structural strength required for the side walls.

The side wall construction of the trailers disclosed in the prior art have additional drawbacks. When these cargo trailers are loaded with cargo, typically a forklift is used to place the cargo in the trailer. Many times the forklift, while doing this, will hit the sides of the trailer causing damage to the sides of the trailer. Eventually, the damage becomes so extensive that the walls have to be replaced, resulting in demotion and reconstruction of the trailer which is very costly.

Additionally, the prior art has constructed thin walls with liners that are made of plastic that snap in between the posts of the wall. These liners, while protecting the side wall, offered no protection of the posts themselves. Other previous cargo trailers have been constructed with plywood liners to protect the posts. However, these plywood liners greatly reduce the interior volume of the trailer and reduce the amount of cargo that can be carried.

Some prior art cargo trailers have front walls constructed of posts with an offset at the front frame so that the outer sheet of the front wall overlaps the front frame like a shingle for weather resistance but the front wall thickness and strength was not a problem.

Thus, there is a need for a cargo trailer side wall that is as thin as possible while still maintaining its structural strength and stiffness. There is also a need for a thin wall construction, which protects the wall posts while still maintaining as thin a wall as possible in order to maximize the cargo volume of the trailer.

SUMMARY OF THE INVENTION

The present invention provides an improved construction of a thin wall for a cargo trailer that maintains is structural strength while at the same time protects the posts from damage. More specifically, the thin wall construction consists of adjacent overlapping outer plates, a plurality of regularly spaced thin posts and a plurality of liner panels between the thin posts.

The thin vertical posts are generally hat-shaped (a modified u-shape) in cross-section and are preferably spaced about two feet on center. The posts also coincide with the overlapping joint between the adjacent outer plates. The thin posts contain flanges (the brim of the hat shape) in which there are holes of equal diameter regularly spaced along the length of the flange. The outer plates also contain holes of equal diameter regularly spaced along the outer plates that coincide with the location of the holes in the flanges of the thin posts.

The liner panels are generally a more elongated hat or u-shape in cross-section and also contain flanges along each edge. The flanges also contain holes along their length. The holes along the length of the flange can either be of alternating diameter such that every other hole is of a smaller diameter than the other intermediate hole or can be of equal diameter. The horizontal distance between the two rows of holes in the liner panels is preferably shorter than the horizontal distance between the two rows of holes in the outer plates.

Fasteners are used to connect the liner panels and thin posts to the adjacent outer plates. These fasteners, preferably rivets, are also used to join the adjacent outer plates together in the overlapping area of the plates.

The liner panels as they are connected to the posts and outer panels are stretched because the horizontal distance between the rows of holes in the liner panels is shorter than the horizontal distance between the rows of holes in the outer plates. This stretching of the liner panels prevents the liner panels from buckling and maintains a uniform interior distance between the side walls.

When constructed with alternating diameter holes along the flange of the liner panels, there is an advantage that is not present in other trailer constructions. Because the larger diameter holes are such that they are larger than the diameter of the rivet head, the rivets only engage the liner panel at every other hole in the flange. The advantage of this becomes apparent when the liner panel becomes damaged and needs to be replaced. Unlike other trailers where that entire damaged wall portion would need to be disassembled by removing all of the rivets, in the present invention only the engaging rivets are drilled out leaving the non-engaging rivets intact. The liner can then be replaced without having to disassemble and/or replace the entire wall of the trailer, thereby saving considerable time and cost in repairing the trailer.

The wall construction, however, can also have liner panels containing holes of equal diameter along the length of the flange. The liner panel thus is simpler to construct but still maintains the advantage of the thin wall construction while losing the advantage of the easy replacement of the liner panel.

Additionally, because the liner panels overlap the post flanges, the panels help to protect the post. The overlap forms a ramp which prevents cargo containers and forklifts from catching the post when the cargo is placed in the trailer resulting in less damage to the posts.

A further object of the present invention is to provide the thin posts with a thinner, offset portion at the bottom end to fit inside the bottom rail of the trailer so that the outer surface of the post above that offset portion is substantially planar with the outside of the bottom rail for mounting the outer plate on the post and rail which, in effect, moves the inside of the post outwardly by the thickness of the rail and increases the interior width of the trailer by twice that amount. Preferably, the top end of the posts may be similarly offset to fit inside the top rail with the outer plate mounted therebetween for improved waterproofing while maximizing the internal width of the trailer.

Additionally, a flat stress plate may be provided along a lower portion of the post at or near the bottom offset for increasing the post strength without significantly increasing the side wall thickness.

BRIEF DESCRIPTION OF THE DRAWINGS

FIG. 1 is a simplified perspective view showing a cargo trailer body incorporating features of the present invention;

FIG. 2 is a diagrammatic sectional plan view of the side wall of the cargo trailer taken along line 2-2 of FIG. 1;

FIG. 3 is an enlarged fragmentary view of a portion of the cargo trailer wall within circle 3 of FIG. 2;

FIG. 4 is a sectional plan view of the side wall of the cargo trailer taken along line 4-4 of FIGS. 3 and 6;

FIG. 5 is a sectional plan view of the side wall of the cargo trailer taken along line 5-5 of FIG. 3;

FIG. 6 is an enlarged fragmentary view of a portion of the cargo trailer wall similar to FIG. 3;

FIG. 7 is a diagrammatic and exploded sectional plan view of the components of the said wall of the cargo trailer of the present invention taken within the circle 7 of FIG. 2;

FIG. 9 is a sectional elevation view of the top portion of the further improved side wall construction of FIG. 8 taken along the line 9A-9A of FIG. 1;

FIG. 9B is a sectional elevation view of the bottom portion of the further improved side wall construction of FIG. 8 taken along the line 9B-9B of FIG. 1;

FIG. 10 is an exploded sectional elevation view of the bottom portion of the side wall construction shown in FIG. 9B but enlarged for clarity;

FIG. 11 is an exploded sectional elevation view similar to FIG. 10 but illustrating a modification of the side wall construction;

FIG. 12 is a sectional plan view of the bottom portion of the side wall construction shown in FIGS. 10 and 11 taken along the line 12-12 of FIG. 1;

FIG. 13 is an elevation view of a portion of the post of the further improved side wall construction of FIGS. 8–12;

FIG. 14 is a sectional view of the post taken along the line 14-14 of FIG. 13; and FIG. 15 is a sectional view of the post taken along the line 15-15 of FIG. 13.

DETAILED DESCRIPTION OF THE PREFERRED EMBODIMENTS

Figure 8:
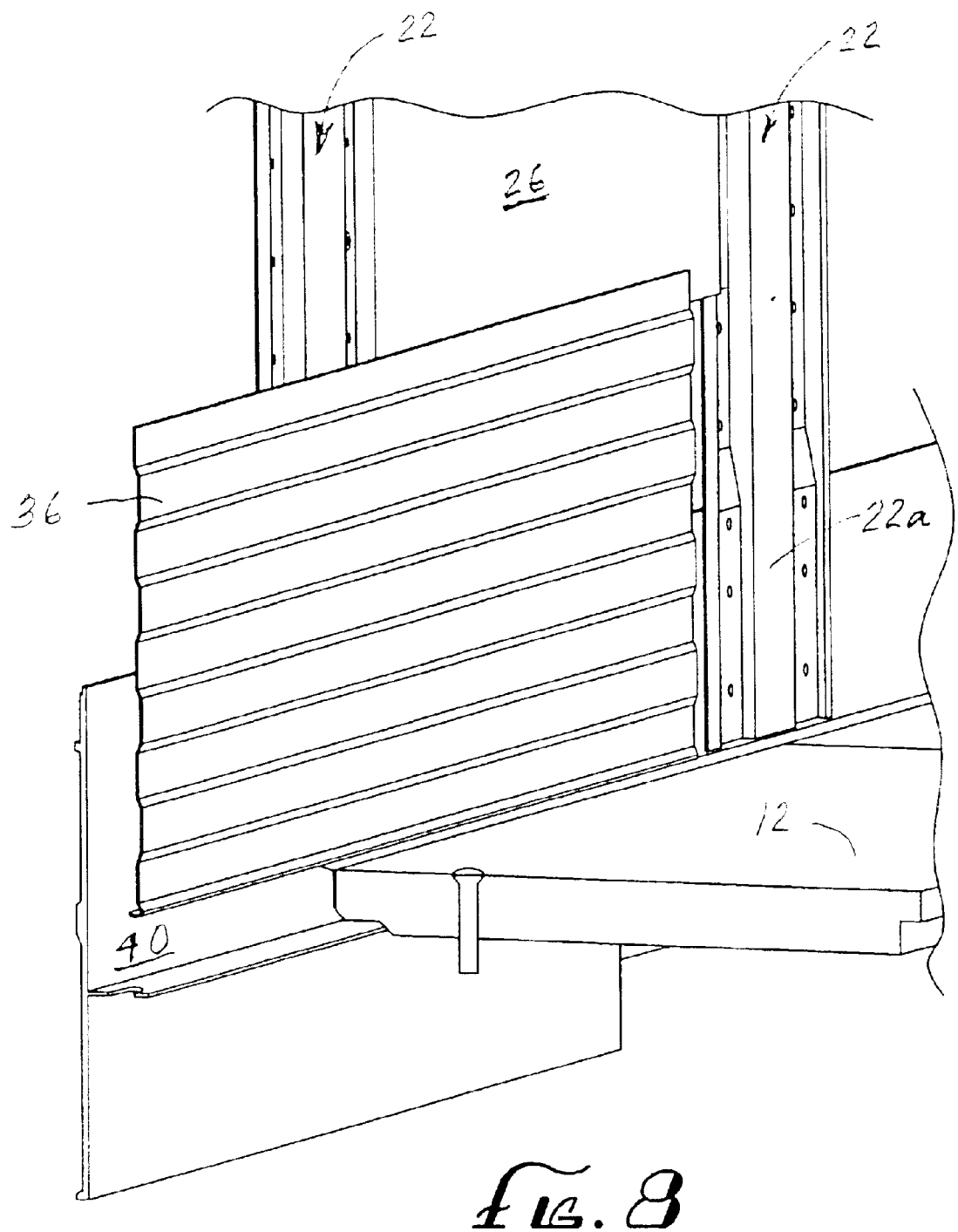
FIG. 8 is fragmentary perspective view of the side wall of the cargo trailer taken within the circle 8 of FIG. 1 illustrating a further improved side wall construction.

The preferred embodiments of the present invention will now be described with reference to the drawings. To facilitate the description, a reference numeral representing an element in one figure will represent the same element in any other figure.

Referring now to FIG. 1 in conjunction with FIGS. 2 and 3, the cargo trailer body 10 includes a floor 12, a roof 14 and a pair of side walls 16 and 18. Each of the side walls contains a plurality of generally flat rectangular outer plates 20 (best viewed in FIGS. 2 and 3) which contain a slight overlapping joint 21 between the adjacent outer plates 20. The outer plates 20 are generally made of lightweight metallic material such as aluminum. The plates 20 are approximately four feet wide in the preferred embodiment, creating an overlapping joint 21 every four feet along the length of the cargo trailer. Each plate may be completely flat or have one edge portion slightly bent outwardly so that it can overlap the previous plate creating the overlapping joint 21.

Referring now to FIG. 2, in conjunction with FIG. 3, a vertical post 22 is preferably placed along the plates every two feet on center in low stress areas of the trailer. In high stress areas of the trailer, such as at the front of the trailer and at the wheel location, the spacing of the thin posts 22 is preferably one foot on center. The thin post 22 is a generally hat-shaped or u-shaped plate in cross-section with flanges 24 (the brim of the "hat") on each edge of the plate with a trough 23 (the head opening of the "hat") between the flanges 24 (best viewed in FIGS. 4 and 5). The flanges 24 contain holes spaced along the length of the flange, preferably about every 2 inches. The holes are of equal diameter sized to match the diameter of the fastener 32 used to connect the thin posts 22 to the plates 20. The plates 20 will also contain holes corresponding to the location of the holes for the thin posts 22 so that the holes in the plats 20 and in the flanges 24 of the thin posts 22 are aligned. The flanges 24 of the thin posts 22 are bent at the edges into a s-shape so that this portion 25 of the flange protrudes laterally in the same direction as the thin posts 22. The plate for the thin posts 22 is generally made of 14 Ga. aluminum or other such lightweight material. However, the thickness of the thin posts 22 can be increased in order to strength the wall, if needed.

A liner panel 26 is generally rectangular and is bent into an elongated hat or u-shape in cross-section with flanges 28 on each edge of the panel 26. The liner panel 26 generally is preferably about 0.019 inches thick in low stress areas of the cargo trailer. In higher stress areas, such as the front of the trailer and at the wheel locations, the liner panel 26 can be preferably increased to 0.035 inches in thickness. The liner panel 26, however, can be of any thickness such that it is thicker in high stress areas than in low stress areas.

Referring now to FIG. 3, the liner panel flanges 28 contain holes 30 along the length of the flanges 28, preferably every two inches on center, to match the holes in post flanges 24. Holes 30 can either be of alternating diameter, as can clearly be seen in FIG. 3, or can be of equal diameter, as can clearly be seen in FIG. 6.

Referring first to FIG. 3, the holes 30 are of a diameter to receive a fastener 32 so that the wider end (head or tail) 33 of the fastener 32 is of a larger diameter than the hole 30. This can be more clearly seen in FIG. 4, which shows the end of the fastener 32 having a larger diameter than the hole 30 in the liner panel 26. In the preferred embodiment, the fasteners 32 used to assemble the thin walls are rivets. However, any other type of fastener could be used to assemble the thin walls. The holes 30 are sized to match the size of the fastener that is used.

Referring to FIGS. 3 and 5, the alternating holes 34 along the length of the flange 28 are of a larger diameter than the wide end 33 of the fastener 32 so that the fastener 32 does not engage with or secure the liner 26. The size of hole 34 is dependent on the type of fastener that is used. This hole 34 can be of any diameter such that it Is larger than the diameter of the fastener used, which prevents the liner panel 26 from engaging with the fastener 32.

The advantage of having only every other hole along the flange 28 of the liner panel 26 engage with the fastener 32 is clear when the liner becomes damaged and needs to be replaced. In a typical wall construction, all of the fasteners used to construct the wall also engage the liner, if one is used. When the liner panel needs to be replaced, all of the fasteners need to be drilled out, which results in deconstruction of the entire damaged portion of the wall, both inside and out. In the present invention, because only every other fastener 32 engages the liner 26, when those fasteners 32 are drilled out to remove the liner 26, the other half of the fasteners 32 are left intact. The liner 26 can then be removed while the post 22 and plates 20 remain in place because the other half of the fasteners 32 are holding them in place.

Referring now to FIG. 6, the liner panel 26 can alternatively be constructed with the holes 30 of equal diameter along the entire length of the flange.

Referring now to FIG. 7, a diagrammatic and exploded sectional plan view of the components of the side wall of the cargo trailer is shown. The distance DP is the horizontal distance between the centerlines of the vertical rows of holes in the outer plates 20. The distance DL is the horizontal distance between the centerlines of the vertical rows of holes in the liner panels 26. The distance DL is less than the distance DP such that the liner panel 26, which is of thinner material than the outer plate 20, is stretched when the fasteners are used to connect the liner panel 26 to the thin posts 22 and outer plates 20. The stretching of the panel prevents the liner panel from buckling.

As can also be seen in FIG. 7, the overlapping joint 21 of the outer plates contains a vertical row of holes. This vertical row of holes is aligned with the vertical row of holes in the thin posts and also the liner panels. The fasteners then connect the liner panels, thin posts and both outer plates together in a simple and single operation.

The bottom of the inside of side walls 16 and 18 are provided with a wear band 36 as shown in FIG. 1. The wear band is made of a lightweight metal, such as aluminum, is corrugated and is approximately 10 inches tall and approximately 3/16-inch thick. The wear band, however, can be of varying height. The liner 26 laps behind the wear band 36 approximately 4-inches, but is above the bottom rail of the outer plate 20 rivet line, and extends to the just below the top rail extrusion on the top of the side walls 16 and 18, exposing the fasteners used to connect the top rail extrusion to the outer plates 20. The liner 26 is fastened to the wear band 36 between the thin posts 22. The liner 26 thus starts above the bottom rail of the thin walls 16 and 18 and ends just below the top rail so that the side wall rivets are not covered up and can be squeezed into the side walls unobstructed by the liner 26. During the same squeezing process for the rivets, the rivets for fastening the thin posts 22 to the outer plates 20 are squeezed into place with the liner 26 also in place, resulting in the liner 26 attached to the wall without an additional squeezing process.

Also, it should be noted that the flange portion 25 of the thin post 22 provides a support or backing for liner 26 but is bent inwardly slightly (toward plate 20) to avoid a sharp edge that might damage the thin panel 26 upon impact or flexing force from the interior of the trailer. Additionally, this s-shaped bend in the flange reinforces the area directly adjacent to the overlap of the thin post flange and the liner panel flange. This added reinforcement helps to reduce damage to the liner when a forklift or cargo container collides with the liner in this area. This s-shaped bend also helps to prevent the liner plate from buckling due to the outward force it exerts on the liner plate.

Referring now to FIGS. 4 and 5, the space between plate 20 and liner 26 can be filled with structural insulator panels 38. The structural insulator 38 can be glued to the inside of liner 26 and is used to prevent the liner from flexing and bending inward toward plate 20 and assists in structurally supporting the liner 26 on the outer plate 20. Styrofoam is used in the preferred embodiment, but any other lightweight material, such as polyurethane, can be used to fill the space between liner 26 and outer plate 20 to prevent the liner from bending inward.

Referring now to FIGS. 8–15, further embodiments and modifications of the present invention are illustrated. The embodiments and alternatives shown in FIGS. 1–7 and described above are also applicable to the embodiments of FIGS. 8–15 with the change being principally in the shape of the post 22 at the top and bottom of the post. Components or portions of components that remain the same in the embodiments of FIGS. 8–15 as those described above with respect to FIGS. 1–7 will be numbered the same and for brevity the description thereof will not be repeated here.

The bottom portion 22a and the top portion 22b of each post 22 are thinner in the inside-to-outside direction than the major length of the post between the bottom and top portions 22a, 22b. The thinner bottom and top portions 22a, 22b are offset toward the interior of the trailer body 10 (see FIGS. 9A, 9B, 10 and 11). These thinned, offset portions 22a, 22b are of a length along the post that preferably is slightly more than the height of the adjacent portion of the bottom side rail 40 of the trailer body 10 so that the offsetting portion 22c on the post is above the top 40a of the bottom side rail 40 in the final assembly. Preferably, the offset or thinning of bottom and top portions 22a, 22b is in an amount approximately equal to the thickness of bottom side rail 40 at the location of the post. The top rail 42 (see FIG. 9A) of the trailer body 10 normally has a thickness substantially similar to the bottom side rail 40. Thus, when the post 20 is mounted on the inside of the bottom side rail 40 and the top side rail 42, the outer surface of the flanges 24 of the post 22 between the bottom and top portions 22a, 22b are substantially coplanar with the outer surface 40b of the bottom side rail 40 and the outer surface 42b of the top side rail 42. This allows the outer plate 20 to be mounted on the outer surface 40b of the bottom side rail 40 and the outer surfaces of flanges 24 (see FIG. 12) in a substantially flat manner continuously from the bottom rail 40 onto the post 22, which not only improves the integrity of the assembly but also the appearance. At the top of the side wall 16, 18, the outer plate 20 is sandwiched between the post 22 and the inside of the top side rail 42 for minimizing the possibility of rain water and the like entering behind the outer plate 20, as might occur with plate 20 mounted on the exterior of top side rail 42.

The interior surface of each post 22 at the trough 23 and flanges 25 remains the same at the bottom and top portions 22a, 22b as the balance of the post 22 and coplanar whereby, in effect, the post 22 has been moved outwardly by approximately the thickness of the side rail 40 as compared to using a post 22 that does not have the offset bottom and top portions 22a, 22b. In turn, this increases the interior width of the trailer body 10 by twice the amount of thinning or offset of each post because each side walls 16, 18 moves outwardly by the amount of that offset thinning of the top and bottom portions of the posts. This increases the interior space of the trailer without increasing the exterior width beyond the legal limit and without increasing the width at the side rails 40 and 42. The outer plates 20, posts 22 and liner panels 26 are assembled in the same manner described with respect to FIGS. 1–7 above and are joined to the bottom side rail 40 and top side rail 42 by the fasteners 32. Preferably additional fasteners (not shown) are provided and pass through the bottom and top side rails 40, 42, along the length of the trailer for mounting the side wall 16, 18 to the trailer.

Referring more specifically to FIGS. 13–15, the preferred configuration of the post 22 at the bottom and top portions 22a, 22b (FIG. 15) and the major portion of the post therebetween (FIG. 14) is shown. For convenience of manufacture, the post 22 is first formed with a uniform cross-section, as shown in FIG. 14, along its entire length such as by roll forming and cutting the posts to the proper length. Then the end portions 22a, 22b are reformed or crushed by appropriate dies to create the cross-section section shown in FIG. 15 having the thinner cross-section. The trough portion 23 of the post 22 is formed with a groove 23a to maintain the lateral width of the post and, more importantly, to maintain the distance between the rows of holes in the pair of flanges 24 of the post at the bottom and top portions 22a, 22b as in the portion of post 22 therebetween, which accommodates the rows of holes in the outer plates 18 and liner panels 26. As an alternative, although not preferred, the rows of holes in the flanges 24 of the posts 22 may be punched after deforming the bottom and top portions 22a , 22b to maintain the uniform spacing of the pair of rows of holes.

Further modifications and improvements to the use of the offset bottom portion 22a of the post 22 are shown in FIGS. 10 and 11. Specifically, in the FIG. 10 a stress plate 44 is provided and sandwiched between the bottom portion 22a of the post and the bottom side rail 40. The stress plate 44 extends upwardly past the offsetting portion 22c for a substantial distance and is sandwiched between the post 22 and the outer plate 20. The stress plate 44 is preferably of approximately the width of the post 22, as shown in FIG. 12, or at least the width from the outer extremes of the pair of flanges 24 of the post 22. Preferably, the stress plate 44 extends a substantial distance above the offset portion 22c of the post 22 but not for the full length of the post. The fasteners 32 pass through the stress plate 44 sandwiched between the post and the outer plate 20 and rail 40 thereby reinforcing the post 20 by forming a box or tubular cross-section and yet the stress plate 44 may be relatively thin to thereby not appreciably increase the thickness of the side wall 16, 18. For example, without limitation, preferably the stress plate 44 may be 0.026 inches thick, 7 inches wide and approximately 36 inches tall in a normal trailer body construction. By comparison, but without limiting the scope of the present invention, the posts 22 are preferably formed of a 14 Ga. material which is 0.0747 inches thick, i.e., nearly three times the thickness of the stress plate 44. Also, by way of example and without limiting the scope of this invention, the thickness of the post 22 is reduced from about ⅜ of an inch to about ¼ of an inch. It should be noted and is apparent from a comparison of the foregoing dimensions to the drawings that the thickness of the materials and components in the drawings are not to scale but rather thinner materials are thickened for ease of illustration.

In the further improvement and modification shown in FIG. 11, the stress plate 46 is positioned higher than the stress plate 44 of FIG. 10 to be above the offset 22c of the post and above the top 40a of the rail, which provides the maximum offset of the posts 20 toward the outside of the trailer body. Stress plate 46 may be of the same dimensions as stress plate 44 and also serves to strengthen the post 20 by forming a box or tubular cross-section with the post after the fasteners 32 are installed. The side walls 16 and 18 of the trailer body 10 may be provided with any combination of stress plates 44 and 46, or without a stress plate, on the plurality of posts along each side wall. In other words, for example, alternate posts 22 may be provided with stress plates 44 extending from the bottom of each post and the posts 22 therebetween may be provided with stress plates 46 positioned above the rail 40, which has been found advantageous for tending to strengthen and bow the posts 22 in opposite directions. Furthermore, it has been found that the offset bottom portion 22a of the posts 22 moves the centroid of the cross-section of the posts toward the center of the width of the post to provide more uniform vertical loading on the post at the bottom portion 22a. By varying the magnitude of the offset, the location of the centroid and therefore the eccentricity of the loading on the post may be advantageously varied, which results in an increase in the strength and durability of the side walls 16, 18 of the trailer body 10. For example, the offset can be set to an amount to cause the centroid to be centrally located in the inside-to-outside direction of the post to eliminate eccentric loading on the post.

While various embodiments, modifications and applications of this invention have been shown and described, it will be apparent to those skilled in the art that other embodiments, modifications and applications are possible without departing from the inventive concepts herein. The invention, therefore, is not to be restricted except in the spirit of the claims that follow.

What is claimed is:

1. A cargo trailer having a thin side wall extending between and connected to a bottom rail and a top rail, comprising;

a plurality of thin vertical posts regularly spaced along the bottom and top rails, each said post having a hat-shaped cross section with a central trough portion between two brim portions forming a post thickness having inner and outer planar surfaces, each said post having a bottom portion overlapping the bottom rail on the inside of the bottom rail, said bottom portion of each post being inwardly offset and having a thinner post thickness than the portion of the post extending between the bottom and top rails to change the location of the centroid of said post relative to the inner planar surface at said bottom portion;

a plurality of vertical, adjacent outer plates mounted on the outer planar surfaces of said posts; and a plurality of vertical, adjacent liner panels mounted on the inner surfaces of said posts.

2. The cargo trailer thin side wall of claim 1, wherein the offset of the bottom portion of said post is in an amount to centrally locate the centroid of the post in the inside-to-outside direction.

3. The cargo trailer thin side wall of claim 1, wherein the offset of the bottom portion of some of said plurality of thin posts is different than others of said plurality of thin posts.

4. The cargo trailer thin side wall of claim 1, wherein the offset of the bottom portion of at least some of said plurality of thin posts is in an amount substantially equal to the thickness of the bottom rail at the location of said bottom portion of said thin post.

5. The cargo trailer thin side wall of claim 4, wherein said outer plates extend downwardly over and are mounted on the exterior of the bottom rail.

6. The cargo trailer thin side wall of claim 1, wherein each said post has a top portion overlapping the top rail on the inside of the top rail, said top portion of each post being inwardly offset and having a thinner post thickness than the portion of the post extending between the top and bottom rails.

7. The cargo trailer thin side wall of claim 1, wherein said bottom portion of each post is formed with a groove in the trough portion for maintaining the width of the post substantially the same along its length.

8. The cargo trailer thin side wall of claim 1, wherein said central trough portion of said post forms said inner planar surface which is continuous along the entire length of said post including said offset bottom portion.

9. The cargo trailer thin side wall of claim 8, wherein said liner panels are mounted in coplanar relation with said inner planar surface of said plurality of posts.

10. The cargo trailer thin side wall of claim 1, wherein said two brim portions of each said post forms said outer planar surface, and said outer plates are mounted on said outer planar surfaces of said plurality of posts.

11. A cargo trailer having a thin wall extending between and connected to a bottom rail and a top rail, comprising;
   a plurality of thin vertical posts regularly spaced along the bottom and top rails, each said post having a hat-shaped cross section with a central trough portion between two brim portions forming a post thickness having inner and outer planar surfaces, each said post having a bottom portion overlapping the bottom rail on the inside of the bottom rail, said bottom portion of each post being inwardly offset and having a thinner post thickness than the portion of the post extending between the bottom and top rails;
   a flat stress plate extending vertically along at least a portion of the outer planar surface of at least some of said posts, each stress plate extending over said trough portion and mounted on said two brim portions;
   a plurality of vertical, adjacent outer plates mounted on the exterior surfaces of said posts; and
   a plurality of vertical, adjacent liner panels mounted on interior surfaces of said posts.

12. The cargo trailer thin side wall of claim 11, wherein said stress plate extends along at least a portion of said bottom portion of said posts.

13. The cargo trailer thin side wall of claim 11, wherein said stress plate extends along the entire bottom portion of said posts.

14. The cargo trailer thin side wall of claim 13, wherein said stress plate extends a substantial distance above said bottom portion of said posts.

15. The cargo trailer thin side wall of claim 11, wherein the entire said stress plate is located immediately above said bottom portion of said posts.

16. The cargo trailer thin side wall of claim 11, wherein said stress plate on some said posts extends along the entire bottom portion of those posts, and the entire said stress plate on other said posts is located immediately above said bottom portion of said posts.

17. The cargo trailer thin side wall of claim 11, wherein the offset of the bottom portion of some of said plurality of thin posts is different than others of said plurality of thin posts.

18. The cargo trailer thin side wall of claim 11, wherein the offset of the bottom portion of at least some of said plurality of thin posts is in an amount substantially equal to the thickness of the bottom rail at the location of said bottom portion of said thin post.

19. The cargo trailer thin side wall of claim 18, wherein said outer plates extend downwardly over and are mounted on the exterior of the bottom rail.

20. The cargo trailer thin side wall of claim 11, wherein said two brim portions of each said post forms said outer planar surface, and said outer plates are mounted on said outer planar surfaces of said plurality of posts.

21. A cargo trailer having thin side walls mounted to top and bottom side rails, each side wall comprising:
   a plurality of adjacent outer plates having regularly spaced vertical rows of holes;
   a plurality of thin posts regularly spaced along the inside of the outer plates, the thin posts being generally hat-shaped in cross-section with a central trough between a pair of brim flanges and a row of holes along each said brim flange matching the rows of holes in said outer plates;
   each said thin post having a bottom portion adjacent the inside of the bottom side rail, said bottom portion being offset inwardly and thinner in the inside-to-outside direction than said thin post above said bottom portion, and holes in the bottom side rail matching the holes in the post brim flanges in said bottom portion;
   a plurality of liner panels with one liner panel positioned inside of and extending between each pair of said thin posts, the liner panels being generally u-shaped in cross section with flanges on each edge of the u-shape overlapping said post brim flanges, a row of holes along each said liner panel flange matching the rows of holes in said outer plates and thin post brim flanges; and
   fasteners passing through each of the holes in said outer plates, bottom side rails thin post brim flanges and liner panel flanges for connecting said outer plates, posts and liner panels together and to the bottom side rail.

22. The cargo trailer thin side wall of claim 21, wherein the offset of the bottom portion of said post is in an amount to centrally locate the centroid of the post in the inside-to-outside direction.

23. The cargo trailer thin side wall of claim 21, wherein the offset of the bottom portion of some of said plurality of thin posts is different than others of said plurality of thin posts.

24. The cargo trailer thin side wall of claim 21, wherein the offset of the bottom portion of at least some of said plurality of thin posts is in an amount substantially equal to the thickness of the bottom rail at the location of said bottom portion of said thin post.

25. The cargo trailer thin side wall of claim 24, wherein said outer plates extend downwardly over and are mounted on the exterior of the bottom rail.

26. The cargo trailer thin side wall of claim 21, wherein each said post has a top portion overlapping the top rail on the inside of the top rail, said top portion of each post being inwardly offset and having a thinner post thickness than the portion of the post extending between the top and bottom rails.

27. The cargo trailer thin side wall of claim 21, wherein said bottom portion of each post is formed with a groove in the trough portion for maintaining the width of the post substantially the same along its length.

28. The cargo trailer thin side wall of claim 21, further including a flat stress plate extending vertically along at least a portion of the exterior of at least some of said thin posts, each said stress plate extending over said central trough and mounted on said two brim flanges of said post.

29. The cargo trailer thin side wall of claim 28, wherein said stress plate extends along at least a portion of said bottom portion of said posts.

30. The cargo trailer thin side wall of claim 28, wherein said stress plate extends along the entire bottom portion of said posts.

31. The cargo trailer thin side wall of claim 30, wherein said stress plate extends a substantial distance above said bottom portion of said posts.

32. The cargo trailer thin side wall of claim 28, wherein the entire said stress plate is located immediately above said bottom portion of said posts.

33. The cargo trailer thin side wall of claim 28, wherein said stress plate on some said posts extends along the entire bottom portion of those posts, and the entire said stress plate on other said posts is located immediately above said bottom portion of said posts.

34. A cargo trailer having thin side walls mounted to top and bottom side rails, each side wall comprising a plurality of adjacent outer plates, a plurality of thin posts and a plurality of interior liner panels, each said post being generally hat-shaped in cross section with a central trough between a pair of brim flanges;

each said post having a bottom portion adjacent the inside of the bottom side rail, said bottom portion being offset inwardly and thinner in the inside-to-outside direction than a portion of the thin post above said bottom portion;

matching holes in the bottom side rail, said outer plates, said posts and said liner panels; and fasteners passing through each of the holes in the bottom side rail, said outer plates, said posts and said liner panels for connecting said outer plates, posts and liner panels together and to the bottom side rail.

* * * * *